United States Patent [19]
Takeuchi

[11] Patent Number: 5,193,762
[45] Date of Patent: Mar. 16, 1993

[54] FISHLINE GUIDE MECHANISM IN SPINNING REEL FOR FISHING

[75] Inventor: Shinji Takeuchi, Tokyo, Japan
[73] Assignee: Daiwa Seiko, Inc., Tokyo, Japan
[21] Appl. No.: 696,560
[22] Filed: May 9, 1991

[30] Foreign Application Priority Data

May 11, 1990 [JP] Japan .............................. 2-48589[U]
May 25, 1990 [JP] Japan .............................. 2-54117[U]

[51] Int. Cl.⁵ ........................................ A01K 89/01
[52] U.S. Cl. ............................ 242/232; 242/319
[58] Field of Search ............. 242/230, 231, 232, 233

[56] References Cited

U.S. PATENT DOCUMENTS

| | | | |
|---|---|---|---|
| 4,403,750 | 9/1983 | Morimoto | 242/232 |
| 4,463,915 | 8/1984 | Kaneko | 242/232 |
| 4,527,752 | 7/1985 | Maruyama et al. | 242/232 |
| 5,004,182 | 4/1991 | Councilman | 242/232 |

FOREIGN PATENT DOCUMENTS

| | | | |
|---|---|---|---|
| 1355745 | 2/1964 | France | 242/230 |
| 44-16703 | 7/1969 | Japan. | |
| 59-139069 | 9/1984 | Japan. | |
| 2167631 | 6/1986 | United Kingdom | 242/233 |

Primary Examiner—Daniel P. Stodola
Assistant Examiner—Tony A. Gayoso
Attorney, Agent, or Firm—Longacre & White

[57] ABSTRACT

A fishline guide mechanism in a spinning reel for fishing, includes: a bail attaching arm provided to a rotor; a bail supporting member pivotally coupled to an end portion of the bail attaching arm so as to invert from one of a fishline releasing position and a fishline winding position to the other of a fishline releasing position and a fishline winding position; and an anti-tangling member provided between the bail supporting member and the bail attaching arm.

9 Claims, 5 Drawing Sheets

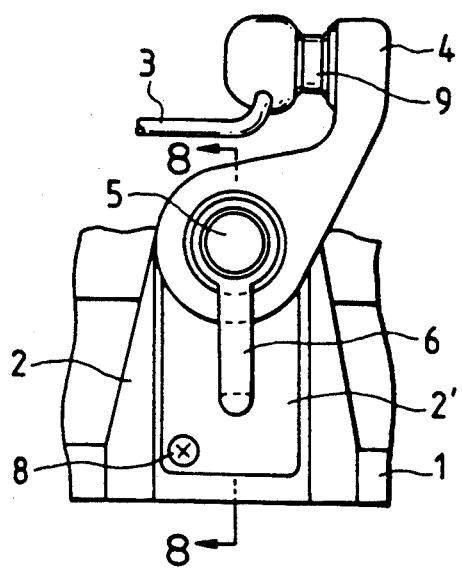
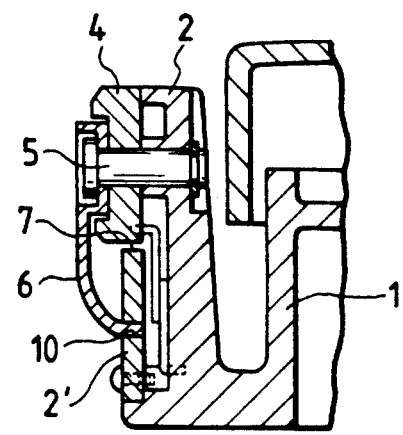
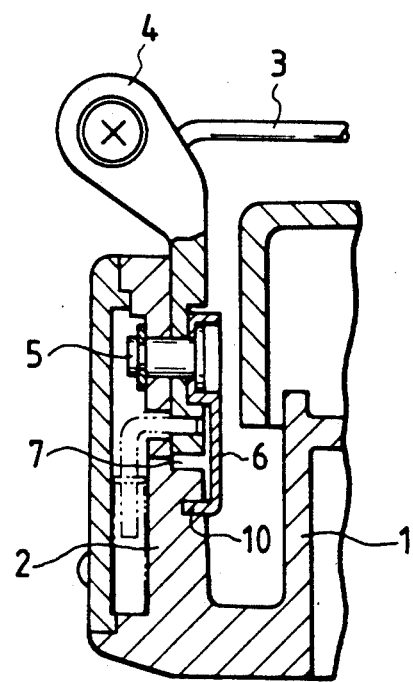

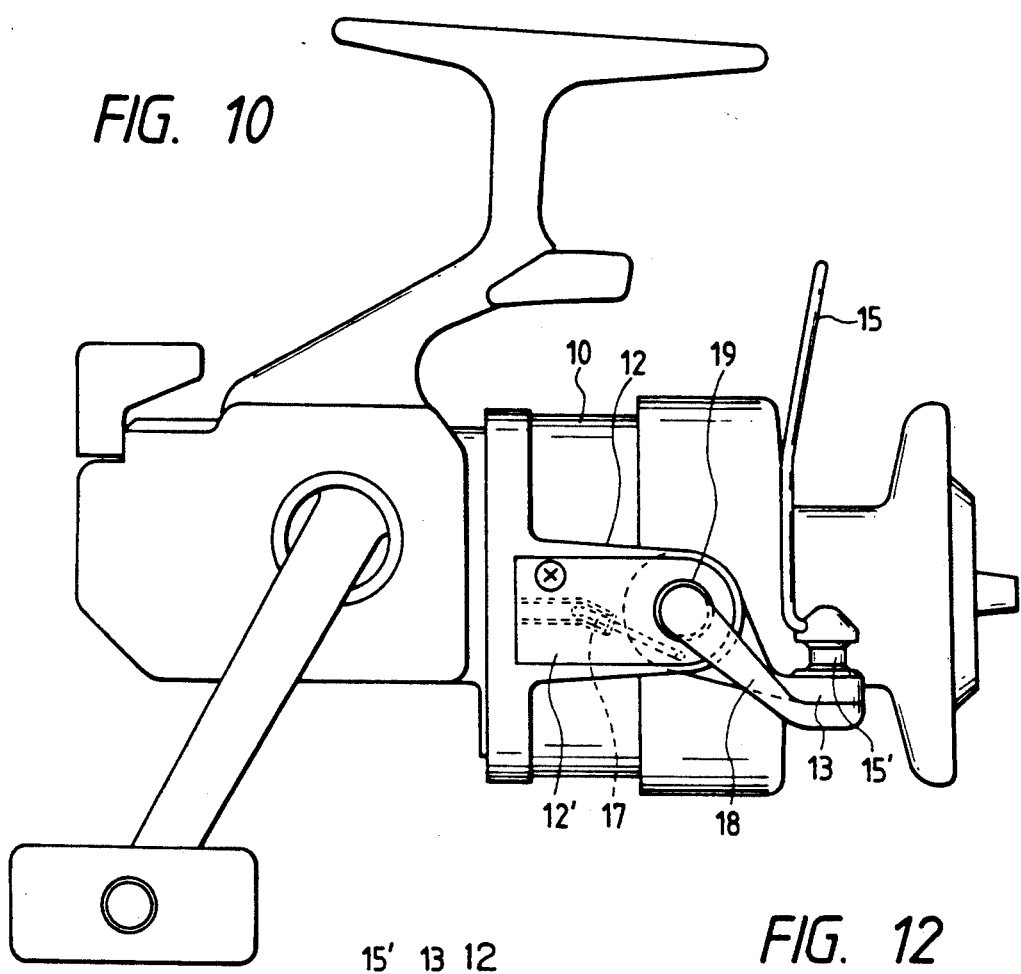
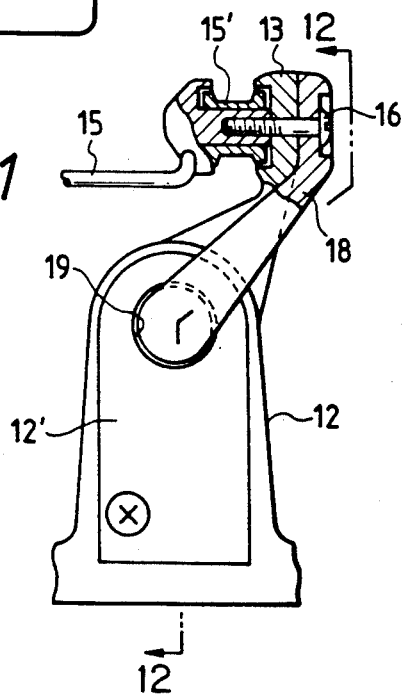
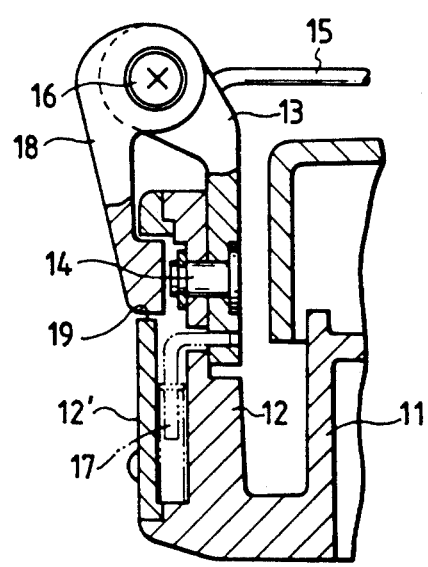

FISHLINE GUIDE MECHANISM IN SPINNING REEL FOR FISHING

BACKGROUND OF THE INVENTION

The present invention relates to an improved fishline guide mechanism in a spinning reel for fishing.

It has been disclosed in the Japanese Utility Model Unexamined Publication No. Sho. 59-139069 that a bail supporting member is pivotally coupled to an end portion of a bail attaching arm of a rotor so as to invert from one of the fishline releasing position and the fishline winding position to the other of them.

However, since a bail supporting member has a gap between the attaching arm and a peripheral edge of an attaching shaft which is provided for pivotally coupling a bail supporting member to the bail attaching arm, the mechanism has a problem that a fishline is accidentally guided into the gap and twines around the fishline guide unit due to the influence of wind or wave at the time of fishing, or the loosening of the fishline or the twisting habit thereof, thereby becoming incapable of being wound, or cutting off or damaging the fishline.

It has been disclosed in the Japanese Utility Model Examined Publication No. Sho. 44-16703 that a bail supporting member having a fishline guide portion is supported to the inside of a bail attaching arm of a rotor. The mechanism, in which the bail supporting member is supported to the inside of the bail attaching arm, has the advantages that the winding operation can be performed smoothly and safely and the reel construction can be small in size because the bail supporting arm is located away from fingers holding a fishing rod. However, since the end portion of the bail supporting member is extended outwardly with respect to an outer side surface of the end of the bail attaching arm so that a height difference wall is formed therebetween, the mechanism has a problem that a fishline twines around the height difference wall due to the influence of wind or wave at the time of fishing, or the loosening of the fishline or the twisting habit thereof at the time of winding of the fishline, thereby becoming incapable of being wound, or cutting off or damaging the fishline.

SUMMARY OF THE INVENTION

The present invention was made in order to solve the problems mentioned above.

Accordingly, it is an object of the present invention to provide a fishline guide mechanism which is in a spinning reel for fishing and operates so that a fishline is prevented from tangling on any of the bail attaching arm or the bail supporting member. The fishline guide mechanism in a spinning reel for fishing, includes: a bail attaching arm provided to a rotor; a bail supporting member pivotally coupled to an end portion of the bail attaching arm so as to invert from one of a fishline releasing position and a fishline winding position to the other of a fishline releasing position and a fishline winding position; and an anti-tangling member provided between the bail supporting member and the bail attaching arm.

According to the present invention, the anti-tangling member is provided to the reel mechanism so that a fishline is prevented from tangling on the fishline guide portion due to the influence of wind or wave at the time of fishing, or the twisting habit of the fishline or loosing thereof at the time of winding of the fishline, thereby winding the fishline smoothly.

In addition, since the gap formed between the peripheral edge of the attaching shaft and the bail attaching arm is covered to protect with the anti-tangling member, the fishline is prevented from cutting off or damaging, thereby performing the winding operation easily, smoothly and safely.

Further, since the bail supporting member can be attached to the inside wall of the bail attaching arm, the reel construction can be small in size.

BRIEF DESCRIPTION OF THE DRAWINGS

FIGS. 5, 6 and 7 are front views showing a main part of yet another embodiments of the present invention, respectively;

FIG. 8 is a section taken along a line C—C of FIG. 7;

FIG. 9 is a sectional view showing a main part of yet another embodiment of the present invention;

FIG. 10 is a front view of a spinning reel which is yet another embodiment of the present invention;

FIG. 11 is a partially broken front view showing a main part of a spinning reel shown in FIG. 10;

FIG. 12 is a section taken along a line D—D of FIG. 11;

DETAILED DESCRIPTION OF THE PREFERRED EMBODIMENTS

Embodiments of the present invention are hereafter described in detail with reference to the drawings attached hereto.

Figure 1:
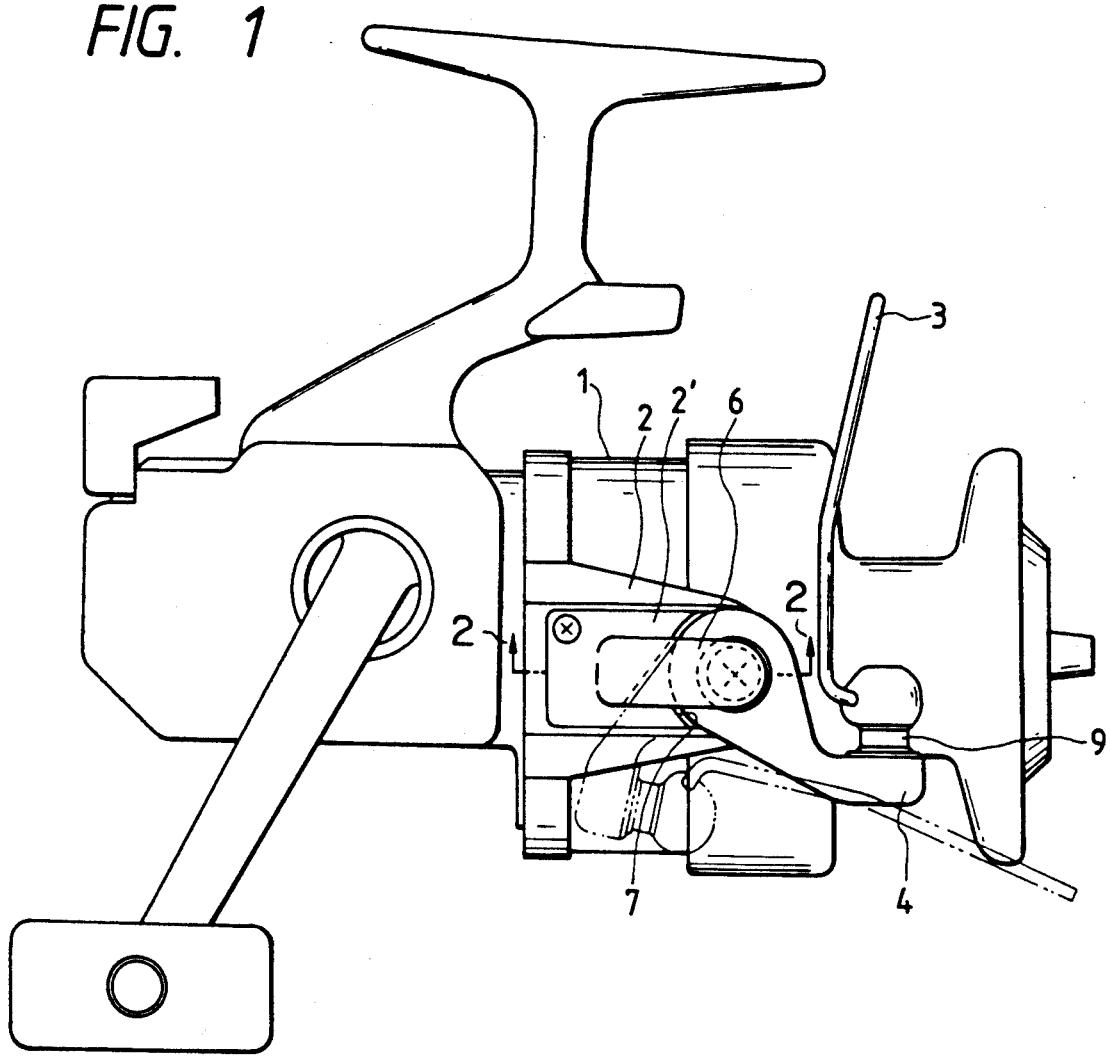
FIG. 1 is a front view of a spinning reel which is an embodiment of the present invention.
Figure 2:
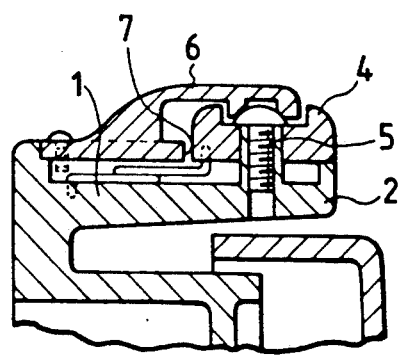
FIG. 2 is a section taken along a line A—A of FIG. 1.

FIGS. 1 and 2 show a spinning reel for fishing which is one of the embodiments.

In the spinning reel, as shown in FIG. 1, bail attaching arms are provided to both sides of a rotor 1. A bail 3 is provided to the first end portion of a bail supporting member 4. The second end portion of the bail supporting member 4 is pivotally coupled to an outer end of a bail attaching arm 2 by an attaching shaft 5 so that the bail 3 can be supported in the fishline winding position shown by the solid line or the fishline releasing position shown by the two dot and dash line. A cover plate 2' is provided on an outer surface of a base portion of the bail attaching arm 2. One end of an anti-tangling member 6 is fittingly secured to the outside second end portion of the bail supporting member 4 and is coaxially provided to the attaching shaft 5, and the other end of it is fittingly engaged with the cover plate 2'. Therefore, a gap 7 formed between the cover plate 2' and the peripheral edge of the second end portion of the bail supporting member 4 is covered with the anti-tangling member 6.

Figure 3:
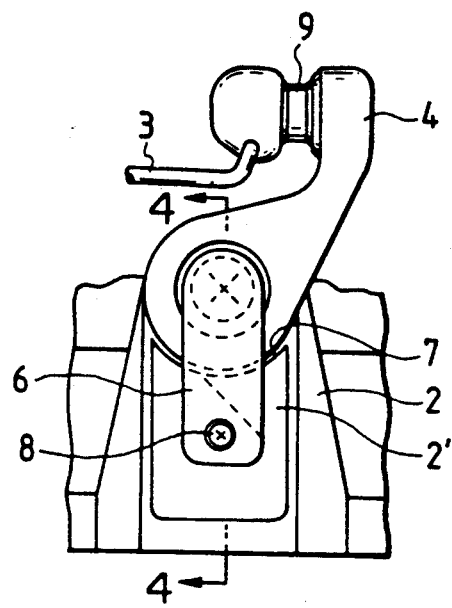
FIG. 3 is a front view showing a main part of another embodiment of the present invention.
Figure 4:
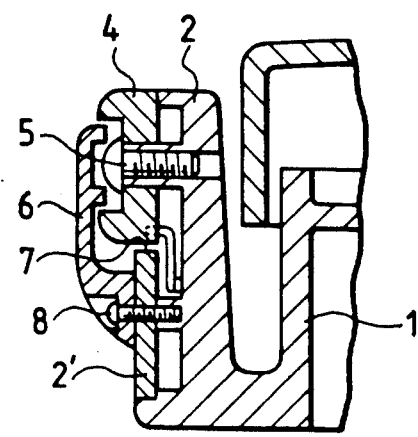
FIG. 4 is a section taken along a line B—B of FIG. 3.
Figure 5:
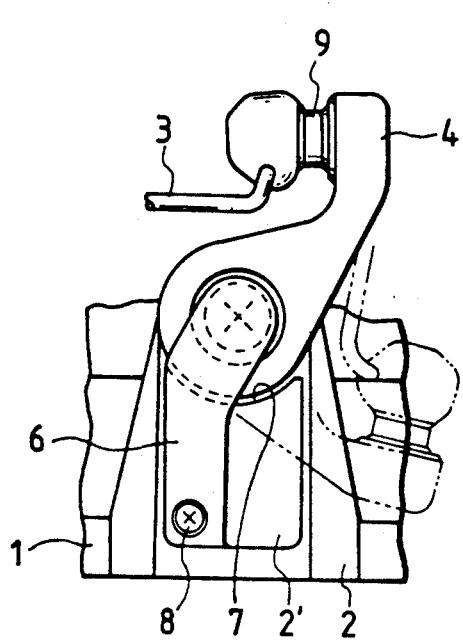

FIGS. 3 and 4 show the second embodiment of the present invention in which the anti-tangling member 6 is fixedly secured to the cover plate 2' by a pivot 8. FIG. 5 shows the third embodiment of the present invention in which the anti-tangling member 6 is fixedly secured to the cover plate 2' by the pivot 8 in such a manner that the anti-tangling member 6 is located to be biased toward the one side of the cover plate 2'.

Figure 6:
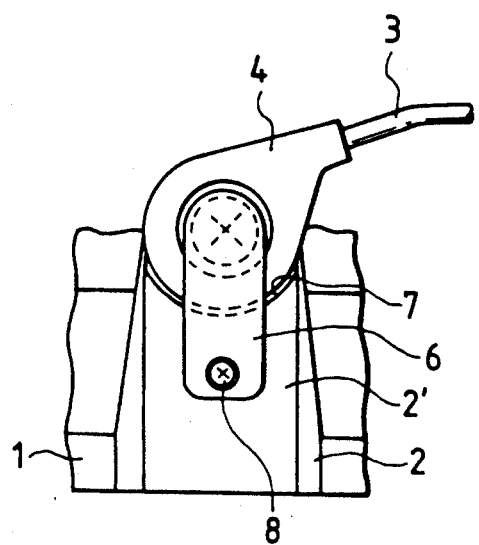

FIG. 6 shows the fourth embodiment in which the anti-tangling member 6 is provided to a bail supporting member 4 which does not have a line roller 9 on the opposite side shown in FIG. 1.

FIGS. 7 and 8 show the fifth embodiment of the present invention in which a base end portion of the anti-tangling member 6 is fittingly supported to a small hole 10 provided to the cover plate 2' of the bail attaching arm 2, and the other end portion of it is fittingly coupled to the bail supporting member 4 by the attaching shaft 5.

Further, FIG. 9 shows the sixth embodiment of the present invention in which the bail supporting member 4 is pivotally coupled to an inside end portion of the bail attaching arm 2 by the attaching shaft 5. In addition, the base end portion of the anti-tangling member 6 is fittingly supported to the small hole 10 provided to the inside base portion of the bail attaching arm 2, and the other end portion of it is coupled to the inside wall of the bail supporting member 4 by the attaching shaft 5.

Accordingly, the gap 7 formed between the bail attaching arm 2 and the peripheral edge portion where the bail supporting member 4 is pivotally secured to the bail attaching arm 2 by the attaching shaft 5 is covered with the anti-tangling member 6, thereby preventing the fishline from being erroneously guided in the gap 7 due to the influence of the wind or wave at the time of fishing, or the twisting habit of the fishline or the loosening thereof.

FIGS. 10-12 show the seventh embodiment of the present invention. In this embodiment, the first end of a bail support member 13 is pivotally coupled to the inside end portion of a bail attaching arm 12 provided to a rotor 11 in the spinning reel by a support shaft 14. A cover plate 12' is provided on an outer surface of the bail attaching arm 12. In addition, a bail 15 having a fishline guide portion 15' such as a roller is fixedly secured to the second end of the bail support member 13 by an attaching shaft 16. In addition, the bail 15 can be held in the fishline winding position or the fishline releasing position by means of a bail distribution mechanism 17.

One end of an anti-tangling member 18 is fixedly secured to the second end of the bail supporting member 13 and on the opposite side to the attaching portion of the bail 15 by the attaching shaft 16. In addition, the other end of the anti-tangling member 18 is fittingly secured to an engagement hole 19 provided to the cover 12' and is coaxially provided to the support shaft 14. Specifically, the other end of the anti-tangling member 18 is fittingly secured on the supporting portion where the bail supporting member 13 is supported to the bail attaching arm 12 by the support shaft 14, through the engagement hole 19.

Figure 13:
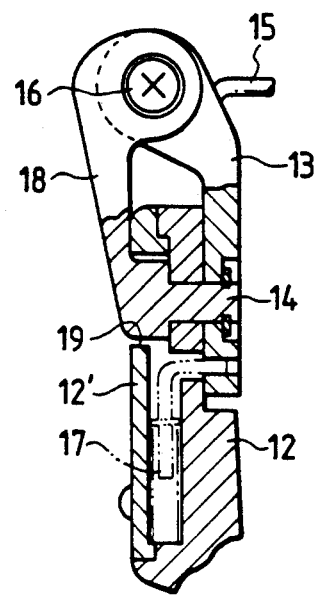
FIG. 13 is a sectional view showing a main part of yet another embodiment of the present invention.

FIG. 13 shows the eighth embodiment of the present invention in which a support shaft 14 for supporting the bail support member 13 is integrally provided with the engagement portion of the anti-tangling member 8 which is engaged with the engagement hole 9.

Figure 14:
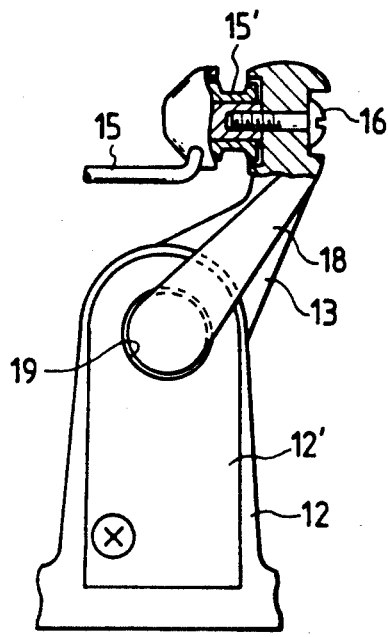
FIG. 14 is a partially broken front view showing a main part of yet another embodiment of the present invention.
Figure 15:
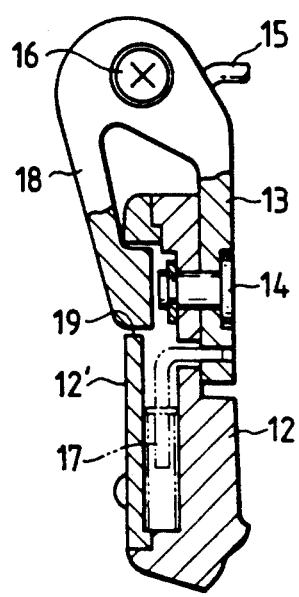
FIG. 15 is a sectional view of the embodiment shown in FIG. 14.

FIGS. 14 and 15 show the ninth embodiment of the present invention in which the anti-tangling member 18 is formed integrally with and made of the same material as the bail support member 13.

Figure 16:
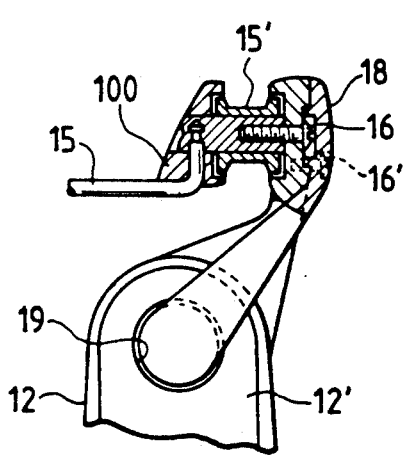
FIG. 16 is a partially broken front view showing a main part of yet another embodiment of the present invention.
Figure 17:
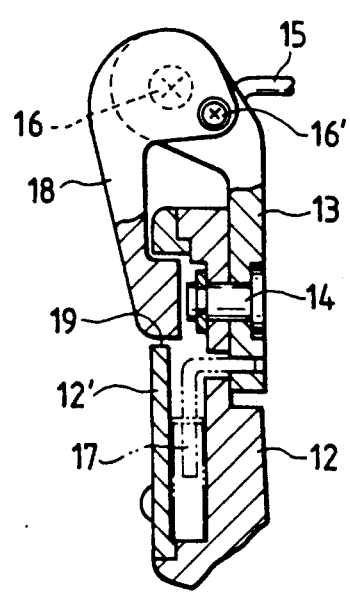
FIG. 17 is a sectional view of the embodiment shown in FIG. 16.

Further, FIGS. 16 and 17 show the tenth embodiment of the present invention in which the anti-tangling member 18 is fixedly secured to the end of the bail supporting member 13 by a pivot 16' which is separate component from the attach shaft 16. In this embodiment, a bail attaching portion 100 is gradually increased from the bail 5 toward a fishing guide portion 5' so that a fishline is prevented from tangling on the bail attaching portion.

Therefore, a fishline is prevented from tangling on the end portion of the bail supporting member 3 due to the influence of wind or wave at the time of fishing, or the twisting habit of the fishline or loosing thereof at the time of winding of the fishline, thereby winding fishline smoothly.

The present invention is not confined to the embodiments described above, but may be embodied or practiced in other various ways without departing the spirits or essential of the invention.

What is claimed is:

1. A fishline guide mechanism in a spinning reel for fishing, comprising:
   a bail attaching arm provided to a rotor, said rotor having an axis of rotation;
   a bail supporting member pivotally coupled to an end portion of said bail attaching arm by an attaching shaft so as to invert from one of a fishline releasing position and a fishline winding position to the other of a fishline releasing position and a fishline winding position; and
   an anti-tangling member provided proximate said bail supporting member and said bail attaching arm, wherein one end of said anti-tangling member directly overlies and covers an axial end of said attaching shaft.

2. A fishline mechanism according to claim 1, wherein said bail supporting member has a first end portion and a second end portion, the first end portion having a fishline guide portion, the second end portion pivotally coupled, by said attaching shaft, radially outside said bail attaching arm with respect to said axis of rotation of said rotor.

3. A fishline guide mechanism according to claim 2, wherein one end of said anti-tangling member is fittingly secured to the second end portion of said bail supporting member and is coaxially provided to said attaching shaft, and the other end of said anti-tangling member is secured to a base portion of said bail attaching arm.

4. A fishline mechanism according to claim 1, wherein said bail supporting member has a first end portion and a second end portion, one side of the first end portion having a fishline guide portion, the second end portion pivotally coupled, by said attaching shaft, radially inside said bail attaching arm with respect to said axis of rotation of said rotor.

5. A fishline guide mechanism according to claim 4, wherein one end of said anti-tangling member is pivotally secured to the first end portion on an opposite side to the fishline guide portion, and the other end of said anti-tangling member is fittingly secured radially outside said bail attaching arm with respect to said axis of rotation of said rotor, and is coaxially provided to said attaching shaft.

6. A fishline guide mechanism according to claim 5, wherein said attaching shaft is integrally provided with said anti-tangling member.

7. A fishline guide mechanism according to claim 5, wherein said bail supporting member is integrally provided with said anti-tangling member.

8. A fishline guide mechanism in a spinning reel for fishing, comprising:
   a bail attaching arm provided to a rotor, said rotor having an axis of rotation;
   a bail supporting member pivotally coupled to an end portion of said bail attaching arm so as to invert from one of a fishline releasing position and a fishline winding position to the other of a fishline releasing position and a fishline winding position;
   an anti-tangling member extending proximate said bail supporting member and said bail attaching arm;
   said bail supporting member having a first end portion and a second end portion, the first end portion having a fishline guide portion, the second end portion pivotally coupled, by an attaching shaft, radially outside said bail attaching arm with respect to said axis of rotation of said rotor;
   wherein one end of said anti-tangling member is fittingly secured to the second end portion of said bail supporting member and covers an axial end of said attaching shaft, and the other end of said anti-tangling member is secured to a base portion of said bail attaching arm.

9. A fishline guide mechanism in a spinning reel for fishing, comprising;
   a bail attaching arm provided to a rotor, said rotor having an axis of rotation;
   a bail supporting member pivotally coupled to an end portion of said bail attaching arm so as to invert from one of a fishline releasing position and a fishline winding position to the other of a fishline releasing position and a fishline winding position;
   an anti-tangling member extending proximate said bail supporting member and said bail attaching arm;
   said bail supporting member having a first end portion and a second end portion, one side of the first end portion having a fishline guide portion, the second end portion pivotally coupled, by an attaching shaft, radially inside said bail attaching arm with respect to said axis of rotation of said rotor;
   wherein one end of said anti-tangling member is pivotally secured to the first end portion on an opposite side to the fishline guide portion, and the other end of said anti-tangling member is fittingly secured radially outside said bail attaching arm with respect to said axis of rotation of said rotor and covers an axial end of said attaching shaft.

* * * * *